United States Patent
Maury et al.

(10) Patent No.: US 10,527,760 B2
(45) Date of Patent: Jan. 7, 2020

(54) OPHTHALMIC LENS COMPRISING A THIN ANTIREFLECTIVE COATING WITH A VERY LOW REFLECTION IN THE VISIBLE REGION

(71) Applicant: ESSILOR INTERNATIONAL (COMPAGNIE GENERALE D'OPTIQUE), Charenton le Pont (FR)

(72) Inventors: Hélène Maury, Charenton le Pont (FR); Dominique Conte, Charenton le Pont (FR); Xingzhao Ding, Singapore (SG)

(73) Assignee: Essilor International, Charenton-le-Pont (FR)

( * ) Notice: Subject to any disclaimer, the term of this patent is extended or adjusted under 35 U.S.C. 154(b) by 314 days.

(21) Appl. No.: 15/421,676

(22) Filed: Feb. 1, 2017

(65) Prior Publication Data

US 2017/0227681 A1 Aug. 10, 2017

(30) Foreign Application Priority Data

Feb. 4, 2016 (EP) ..................................... 16305127

(51) Int. Cl.
*G02B 1/116* (2015.01)
*G02B 1/115* (2015.01)
*G02C 7/02* (2006.01)
*G02B 1/16* (2015.01)
*G02B 1/14* (2015.01)

(52) U.S. Cl.
CPC ................ *G02B 1/116* (2013.01); *G02B 1/14* (2015.01); *G02B 1/16* (2015.01); *G02C 7/022* (2013.01); *G02C 2202/16* (2013.01)

(58) Field of Classification Search
CPC ....... G02C 7/02; G02C 7/022; G02C 2202/16
See application file for complete search history.

(56) References Cited

U.S. PATENT DOCUMENTS

| 6,210,784 | B1 | 4/2001 | Rondeau et al. |
| 2004/0114101 | A1* | 6/2004 | Thakrar ................. G02C 7/046 351/159.11 |
| 2007/0166522 | A1 | 7/2007 | Beinat et al. |
| 2012/0048364 | A1 | 3/2012 | Auvray et al. |
| 2017/0102489 | A1* | 4/2017 | Brown ..................... G02C 7/10 |

FOREIGN PATENT DOCUMENTS

WO    WO 9304993    3/1993

OTHER PUBLICATIONS

Office Action issued in Corresponding European Application No. 16305127, dated Aug. 14, 2019.

* cited by examiner

*Primary Examiner* — Laura C Powers
(74) *Attorney, Agent, or Firm* — Norton Rose Fulbright US LLP

(57) ABSTRACT

This invention relates to an ophthalmic lens comprising a transparent substrate with a front main face and with a rear main face, at least one of the main faces being coated with a multilayered antireflective coating comprising a stack composed of at least:
 (i) a wetting layer;
 (ii) a metal layer, wherein the metal is selected from silver, gold or copper or mixtures thereof;
 (iii) a protective layer which is able to avoid oxidation of said metal layer,
characterized in that wetting layer (i) is in direct contact with metal layer (ii), with the proviso that said multilayered antireflective coating does not comprise silicon nitride and wherein (ii) the metal layer has a physical thickness equal to or higher than 6 nm.

19 Claims, 4 Drawing Sheets

(a)  (b)

(a)           (b)

OPHTHALMIC LENS COMPRISING A THIN ANTIREFLECTIVE COATING WITH A VERY LOW REFLECTION IN THE VISIBLE REGION

FIELD OF THE INVENTION

The present invention relates to an ophthalmic field comprising a transparent thin antireflective coating which strongly reduces reflection in the visible region and preferably also in the UV region. The ophthalmic lens may especially be a spectacle lens.

DESCRIPTION OF RELATED ART

An antireflection coating usually consists of a multilayer comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

However, to obtain satisfactory optical properties, this antireflection coating comprises at least three layers, preferably at least four layers, of high refractive index layer and low refractive index layer, for a total thickness ranges from 200 to 250 nm, wherein at least one high refractive index layer has a thickness of about 100 nm.

However, this relatively thick antireflective coating may present not only thermomechanical weakness, but also process and optical performance control difficulties. Indeed, for instance, it may be difficult to obtain a good robustness of a lens with this kind of antireflective coating. Here, the term "robustness" of a lens is defined as the ability of this lens to resist change despite the variations induced by its manufacture process. These variations depend, for instance, on the type of substrate which is used, the setting of the manufacturing machine (temperature schedule, appropriate time, setting of the electron gun . . . ) and/or its usage mode, the replacement of said manufacturing machine by another one.

So as to reduce the thickness of the above traditional antireflective coating, several solutions have been proposed in the prior art.

For instance, thin antireflective coating composed of a single layer of quarterwave layer for a specific wavelength of light or of a bilayer constituted of one high refractive index layer and one low refractive index layer are known. Nevertheless, in the both cases, the optical performance of these antireflective coatings is not good enough for the ophthalmic field, and especially the reflection is spectrally not large enough.

In addition, it is also known from the prior art to add thin layers of gold (Au) or silver (Ag) into interferential filters of optical article, especially of low-emissivity glass (Infrared reflector).

For instance, document JP2004/334012 describes an optical article, such as ophthalmic lens, comprising a transparent substrate coated with an antireflection coating whose total physical thickness ranges from 71 to 112 nm according to the examples of this document. Especially, the antireflection coating comprises at least in the direction moving away from the substrate:
 a middle refractive index layer (such as $Si_2N_3$);
 a high refractive index layer, and
 a low refractive index layer (such as $SiO_2$),
  wherein the high refractive index layer comprises a metal selected from silver (Ag), aluminum (Al) or tin (Sn) having, according to all the examples of this document, a physical thickness of less than 5 nm.

In particular, the examples have the following antireflective coating structures (in the direction moving away from the substrate):
 $Si_2N_3$ (30.66 nm)/$SiO_2$ (6.51 nm)/Ag (4.11 nm)/$SiO_2$ (71.08 nm)
 $Si_2N_3$ (30.66 nm)/Ag (4.11 nm)/$SiO_2$ (71.77 nm)
 $Si_2N_3$ (35.02 nm)/Ag (4.89 nm)/$Si_2N_3$ (5.79 nm)/$SiO_2$ (66.31 nm).

It is indicated that the maximum reflectance in the visible region (400 to 750 nm) is about 0.4% or less.

However, as demonstrated by the Applicant in the experimental part below, the experimental results of this document JP2004/334012 seem purely theoretical since a very thin layer of silver (lower than 5 nm in all examples) does not enable to obtain a continuous metal layer and good optical performances. Especially, for an antireflection coating having a very thin metal layer, there is a clear difference between the theoretical reflection and the reflection obtained from an experimental assay.

Document EP 0 867 733 describes an optical member having an antireflection coating for reducing a ray reflecting on the coating, for reducing an electromagnetic wave incident on the coating and also for preventing the fatigue of the eyes. According to all the examples of this document, the antireflection coating comprises: a transparent substrate, and provided thereon, three light transmitting thin layers or more, wherein at least one of the three light transmitting thin layers may comprise at least one metal selected from Au and Ag, having a physical thickness ranging from 10 to 15 nm, and at least one of the three light transmitting thin layers is a conductive layer made of indium oxide doped with tin (ITO) having a physical thickness ranging from 35 to 127 nm. Therefore, ITO is essential to perform the coating according to this invention. For instance, samples 5 and 6 of example 1 and examples 2 to 4 do not comprise a metal layer.

However, this antireflection coating comprising notably a relative large thickness of a conductive layer made of ITO presents relatively low transmittance values (generally ≤80%).

Therefore, there is still a need to provide novel transparent antireflective coatings for ophthalmic lens having very good antireflective properties, especially in the visible region and preferably also in the UV region, while having at the same time robustness properties and good aesthetic appearance, and while being in particular as thin as or thinner than the traditional antireflection coating of the prior art described above.

There is also still a need to provide a novel transparent antireflective coatings for ophthalmic lens, which are simple, easy to implement and reproducible.

SUMMARY OF THE INVENTION

An object of the invention is therefore to remedy of these needs, by seeking to develop a transparent ophthalmic lens, comprising a substrate in mineral or organic glass comprising at least a thin antireflective coating, said antireflective coating possessing very good antireflective performances in the visible region, and preferably also in the UV region, while guarantying high robustness, and to do so without compromising the economic and/or industrial feasibility of its manufacture.

In another aspect of the invention, the thin antireflective coating is easy to implement.

The invention therefore relates to an ophthalmic lens comprising a transparent substrate with a front main face and with a rear main face, at least one of the main faces being coated with a multilayered antireflective coating comprising a stack composed of at least:
(i) a wetting layer;
(ii) a metal layer, wherein the metal is selected from silver, gold or copper or mixtures thereof;
(iii) a protective layer which is able to avoid oxidation of said metal layer,
characterized in that the wetting layer (i) is in direct contact with the metal layer (ii), with the proviso that said multilayered antireflective coating does not comprise silicon nitride ($Si_3N_4$) and wherein (ii) the metal layer has a physical thickness equal to or higher than 6 nm.

The Applicant has discovered that the use of a metal layer having a physical thickness of at least 6 nm, combined with the use of a wetting layer and a protective layer (preferably the metal layer is disposed between said wetting layer and said protective layer), make it possible to obtain a transparent thin antireflection coating for an ophthalmic lens having an effect over a broad reflection band, especially in the visible region.

Indeed, the Applicant has surprisingly discovered that a metal layer having a thickness of less than 6 nm does not enable to obtain a continuous metal layer, which is essential to obtain an appropriate transmittance of the antireflective coating.

Indeed, as it will be shown in the examples below, below a thickness of 6 nm, plasmonic effects occur and the metal, such as silver (Ag), does not form a continuous layer, but clusters of metal. These clusters of metal locally represent a significant concentration of free electrons that gives rise to collective fluctuations, called surface plasmon. Under the influence of an incident magnetic field, there is a surface coupling effect with electrical dipoles yielding light absorption and emission of plasmonic frequency light which is specific to the metal. For instance, for silver layer having a theoretical thickness less than 6 nm, this emission of plasmonic frequency light gives a residual reflected color which appears blue. Thus, due to this surface plasmon phenomenon, the absorption of the metal layer composed of clusters of metal is different of the theoretical absorption which may be calculated by softwares and therefore, there is a deviation from theoretical metal indices table and experimental results. This point confirms that the document JP2004/334012 only teaches theoretical results since the examples of this document comprise silver layer having a physical thickness of 4.11 nm which leads inevitably to silver clusters and hence to surface plasmon phenomenon. Indeed, only a continuous layer of metal layer avoids the supplementary absorption due to surface plasmon phenomenon. In addition, in this document, none wetting layer is used. However, this wetting layer is essential so as to adhere the metal layer to the lens substrate. Thus, the document is not relevant as prior art.

In addition, the Applicant has also discovered that the silicon nitride is not essential for obtaining a thin antireflective coating according to the invention. Usually, silicon nitride is deposited under highly energetic sputtering conditions yielding very dense layers to provide chemical and/or mechanical protection to antireflective coatings. Indeed, the exclusion of silicon nitride still leads to good results in term of optical performances and chemical/mechanical resistance as it will be shown in the examples below and this, by using a process which is easier to implement (i.e.: vacuum evaporation). Thus, the invention is an alternative to the antireflective coating proposed in the prior art which discloses the use of silicon nitride for protecting metal layer of oxidation.

Moreover, it has been surprisingly found that the ophthalmic lens according to the invention presents good robustness properties, good aesthetic appearance whatever the angle of incidence and is easy to implement.

BRIEF DESCRIPTION OF THE DRAWING

The present invention will be described in more detail by referring to the appended drawings, wherein.

Figure 1:
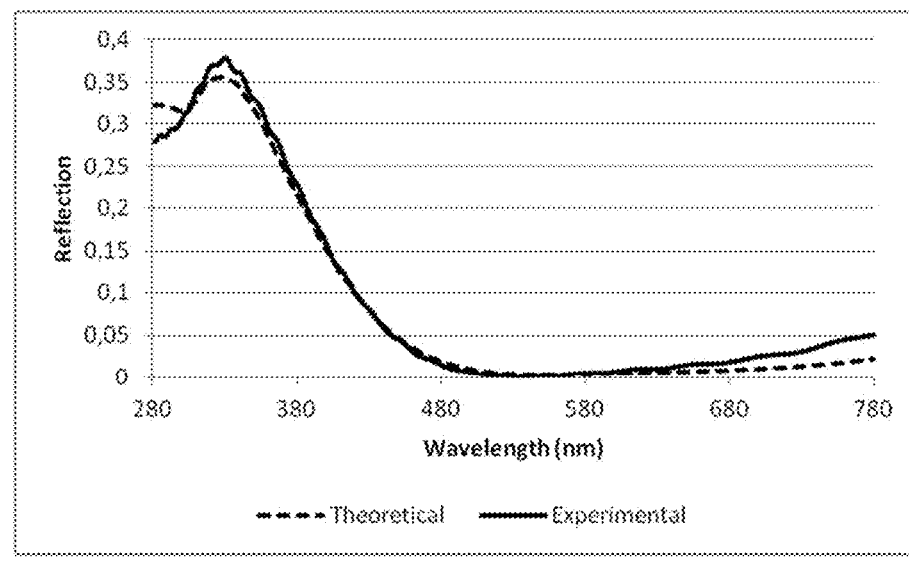
FIG. 1 shows the variation of the experimental and theoretical reflection R on the front face (convex face) of a lens 1 according to the invention as function of the wavelength (280 to 780 nm) at an angle of incidence of 15°.
Figure 2:
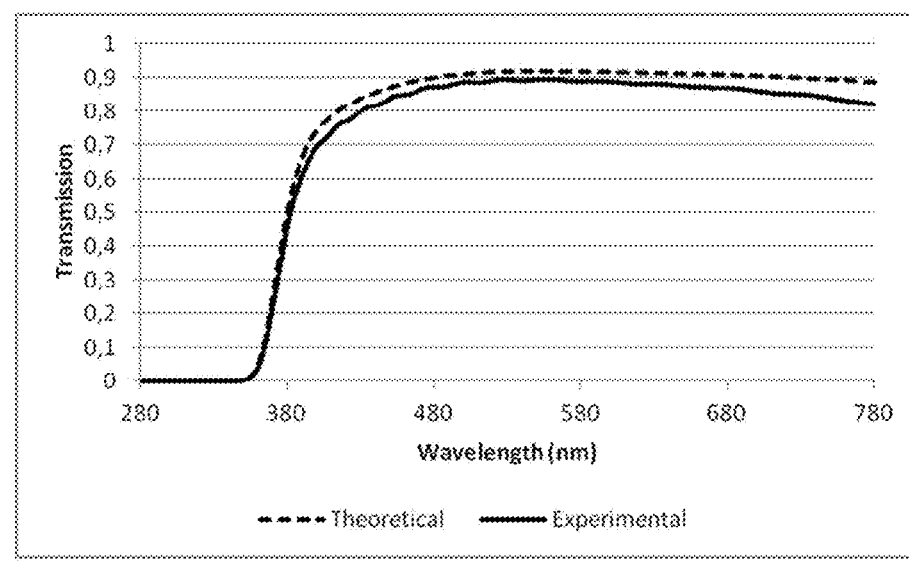
FIG. 2 shows the variation of the experimental and theoretical Transmission Tv of the lens 1 according to the invention as function of the wavelength (280 to 780 nm) at an angle of incidence of 0°.
Figure 3:
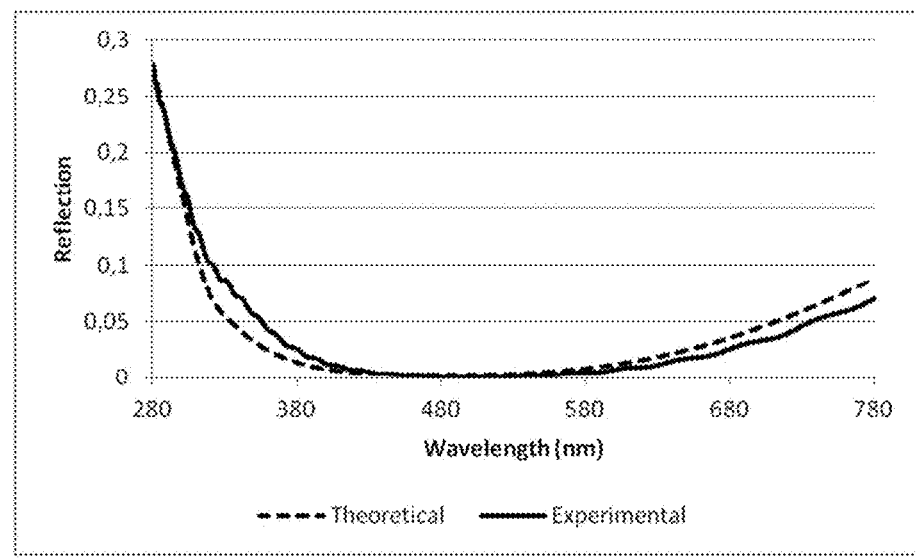
FIG. 3 shows the variation of the experimental and theoretical reflection R on the front face (convex face) of a lens 2 according to the invention as function of the wavelength (280 to 780 nm) at an angle of incidence of 15°.
Figure 4:
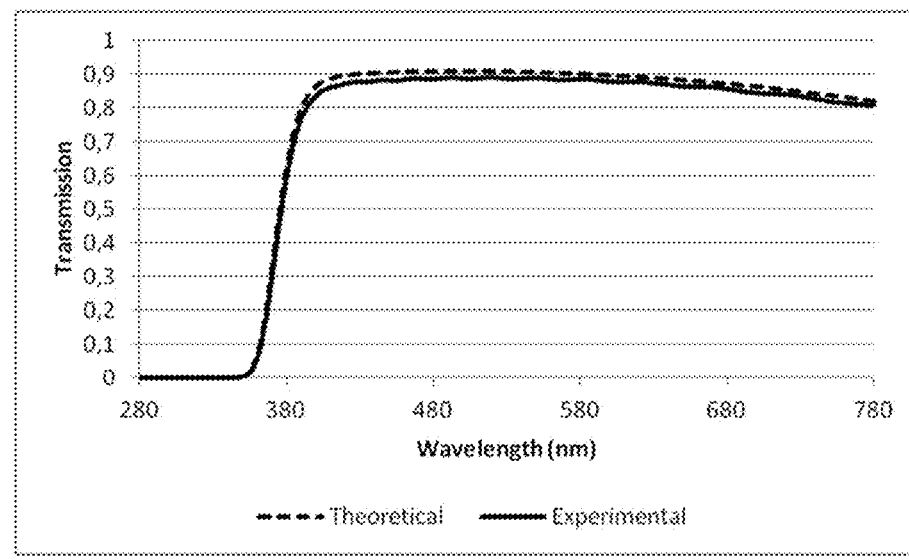
FIG. 4 shows the variation of the experimental and theoretical Transmission Tv of the lens 2 according to the invention as function of the wavelength (280 to 780 nm) at an angle of incidence of 0°.

In these figures, all experimental data are solid lines. All theoretical results are dotted lines.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

In addition, any layer having a thickness lower than 1 nm will not be considered when counting the number of layers in the antireflective coating.

Unless stated otherwise, all thicknesses disclosed in the present application relate to physical thicknesses.

In the present application, when an ophthalmic lens comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the ophthalmic lens, is the nearest from the wearer's eye. It is generally a concave face. On the contrary, the front face of the substrate, is the face which, when using the ophthalmic lens, is the most distant from the wearer's eye. It is generally a convex face.

The ophthalmic lens prepared according to the present invention is a transparent ophthalmic lens, preferably an ophthalmic lens or lens blank. The ophthalmic lens may be coated on its convex main side (front side), concave main side (back side), or both sides using the invention.

Generally speaking, the antireflective coating of the ophthalmic lens according to the invention, which will be called "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Prior to depositing the antireflective coating, the substrate may be coated with one or more functional coatings. These functional coatings traditionally used in optics may be, without limitation, an impact-resistant primer layer, an abrasion-resistant coating and/or a scratch-resistant coating, a polarizing coating, a photochromic coating or a tinted coating. The surface of said optionally coated substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultra-violet treatment or a plasma-mediated treatment under vacuum, generally using an oxygen or an argon plasma. It may also be an acid or basic treatment and/or a solvent-based treatment (water, hydrogen peroxide or any organic solvent).

Prior to depositing the antireflective coating, the optionally coated substrate may be also coated with a sub-layer.

As used herein, a sub-layer or adhesion layer is intended to mean a relatively thick coating, used in order to improve the mechanical properties.

Traditional sub-layer has a thickness that is sufficient for promoting the abrasion resistance of the antireflective coating, but preferably not to such an extent that a light absorption could be caused, which, depending on the sub-layer nature, could significantly reduce the relative transmission factor $T_v$. Its thickness is generally lower than 300 nm, more preferably lower than 200 nm, and is generally higher than 90 nm, more preferably higher than 100 nm. Traditional sub-layer comprises a $SiO_2$—based layer, this layer comprising preferably at least 80% by weight of silica, more preferably at least 90% by weight of silica, relative to the layer total weight, and even more preferably consists in a silica layer.

According to the invention, so as to reduce the thickness of the antireflective coating according to the invention, said antireflective coating is not deposited onto a sub-layer (the layer of the antireflection coating which is the nearest of the substrate).

In the following, a substrate means either a bare substrate or a coated substrate.

As previously mentioned, the ophthalmic lens according to the invention, comprises a transparent substrate with a front main face and with a rear main face, at least one of the main faces being coated with a multilayered antireflective coating comprising a stack composed of at least:
 (i) a wetting layer;
 (ii) a metal layer, wherein the metal is selected from silver, gold or copper or mixtures thereof;
 (iii) a protective layer which is able to avoid oxidation of said metal layer.

This antireflective coating is characterized in that the wetting layer (i) is in direct contact with metal layer (ii), with the proviso that said multilayered antireflective coating does not comprise silicon nitride and wherein (ii) the metal layer has a physical thickness equal to or higher than 6 nm.

In general, the metal layer (ii) has a physical thickness ranging from 6 nm to 20 nm, and preferably ranging from 7 nm to 15 nm.

Indeed, as mentioned above, it is essential that the metal layer has a thickness of at least 6 nm for obtaining a continuous metal layer allowing to avoid supplementary absorption due to plasmonic effects. However, it is also preferable to limit the upper thickness limit. Indeed, it is known that metal layer, such as gold or silver, are relatively absorbent and thus, limit the light transmission. Therefore, so as to obtain an antireflective coating with an appropriate transparency, it is preferable that the thickness of the metal layer (ii) is equal or lower than 20 nm, such as equal or lower than 15 nm or equal or lower than 12 nm and for instance equal or lower than 10 nm. Thus, it is not obvious to use metal layer for forming an antireflective coating, especially in the ophthalmic field.

According to the invention, the metal of the metal layer is selected from silver, gold or mixture thereof and is typically silver.

Depending on deposition procedures, order of layers (i) to (iii) may differ.

In some embodiments, the antireflective coating of the invention is deposited directly on the substrate. In this case, the metal layer (ii) is preferably disposed between the protective layer (iii) and the wetting layer (i).

In other embodiments, the antireflective coating of the invention is deposited on a carrier film, then reported on the substrate. In this case, the final order of layers on the substrate will be reversed as compared to the order of layers on the carrier. Hence, the first layer deposited on the carrier will be a protection layer, then a wetting layer, then the metal layer. After report, the metal layer will be located in direct contact with the substrate. In some embodiments, so as to protect the metal layer during report process, an additional protection layer may be added as a fourth layer during deposition on the carrier. In these embodiments, the final order of the antireflective coating on the substrate will be, in the direction moving away from substrate: optional protection layer, metal layer (ii), wetting layer (i) and protection layer (iii).

In all cases, the metal layer is deposited directly on the wetting layer and the protection layer is more distant from the substrate than the metal layer in the final antireflective coating.

Generally, the three layers (i) to (iii) are in direct contact in the following order in the direction moving away from substrate:

wetting layer then metal layer then protection layer, or
metal layer then wetting layer then protection layer.

Preferably, the wetting layer (i) is disposed immediately onto the lens substrate and beneath the metal layer.

As it will be shown in the examples below, the use of the wetting layer (i) and the protective layer (iii) is essential to the invention.

The function of said wetting layer (i) is to increase the wetting and bonding of the layer coating onto the lens substrate.

In general, the wetting layer (i) has a physical thickness higher than or equal to 10 nm, preferably higher than or equal to 20 nm and lower than or equal to 70 nm and is typically ranging from 25 to 60 nm.

Especially, the wetting layer (i) has a surface energy which is equal to or lower than 45 mN/m, preferably equal to or lower than 40 mN/m. $ZrO_2$, $TiO_2$ and $Ta_2O_5$ layers all have surface energy below 40 mN/m and are particularly suited for wetting layers. According to the invention, the surface energy of a lens is determined by Owens-Wendt method using a drop shape analysis program (see "Estimation of the surface force energy of polymers" Owens D. K., et al., J. Appl. Polym. Sci. 13, 1741-1747 (1969)).

According to the invention, the wetting layer (i) may also been characterized in that it has a high refractive index which is higher than 1.55.

Unless otherwise specified, the refractive indexes referred to in the present application are expressed at 25° C. at a wavelength of 550 nm.

In the present application, a layer of the antireflective coating is said to be a layer with a high refractive index (HI) when its refractive index is higher than or equal to 1.55, preferably higher than or equal to 1.6, even more preferably higher than or equal to 1.7, even more preferably higher than or equal to 1.8 and most preferably higher than or equal to 1.9. Said HI layer preferably has a refractive index lower than 2.5. A layer of an antireflective coating is said to be a low refractive index layer (LI) when its refractive index is lower than 1.55, preferably lower than 1.50, more preferably lower than or equal to 1.48. Said LI layer preferably has a refractive index higher than 1.1.

For instance, the wetting layer (i) may be made from a component selected from: $ZrO_2$, $SnO_2$, $ZnO$, $TiO_2$, $Nb_2O_5$, $Y_2O_3$, $HfO_2$, $Sc_2O_3$, $Ta_2O_5$, $Pr_2O_3$, $Al_2O_3$ or mixtures thereof and is preferably $ZrO_2$, $TiO_2$ or $Ta_2O_5$, more preferably $ZrO_2$.

According to a particular embodiment of the invention, a thin (lower than 2 nm) adhesion layer of NiCr and/or NiTi may be deposited on the wetting layer (i) made of a material having a high refractive index which is higher than 1.55, such as $ZrO_2$.

The embodiment presents the advantages of further increasing adhesion of metal layer.

In addition, to prevent oxidation of the metal layer and to attenuate its reflection properties in the visible spectrum, the antireflective coating comprises the protective layer (iii). Generally, the protective layer (iii) is more distant from the substrate than the metal layer (ii) in the final antireflective coating. Said protecting layer is especially intended to protect the metal layer if the deposition of a subsequent film is carried out in an oxidizing atmosphere or in the case of heat treatments resulting in oxygen migration into the antireflective stack.

In general, the protective layer (iii) has a physical thickness higher than or equal to 10 nm, preferably higher than or equal to 20 nm and lower than or equal to 80 nm and is typically ranging from 40 to 75 nm and in particular from 45 to 70 nm.

For instance, the protective layer (iii) has a low refractive index or a high refractive index. Generally, said protective layer (iii) is made from a component selected from: $SiO_2$, $ZrO_2$, $SnO_2$, $ZnO$ or mixture thereof and is preferably $ZrO_2$ or $SiO_2$.

According to a characteristic of the invention, the antireflective layer does not comprise NiCr, ITO, or mixture thereof.

Preferably, the multilayered antireflective coating according to the invention only comprises the three layers (i) to (iii).

According to an embodiment of the invention, the antireflective coating comprises, in the direction moving away from the substrate:
  one wetting layer having a physical thickness of from 10 to 70 nm, one metal layer having a physical thickness of from 7 to 20 nm, one protective layer having a physical thickness of from 10 to 80 nm.

Especially, the antireflective coating comprises, in the direction moving away from the substrate, one wetting layer having a physical thickness of from 25 to 60 nm, one metal layer having a physical thickness of from 7 to 15 nm, one protective layer having a physical thickness of from 45 to 70 nm.

According to another embodiment of the invention, the antireflective coating comprises, in the direction moving away from the substrate:

one metal layer having a physical thickness of from 7 to 20 nm, one wetting layer having a physical thickness of from 10 to 70 nm, one protective layer having a physical thickness of from 10 to 80 nm.

Especially, the antireflective coating comprises, in the direction moving away from the substrate, one metal layer having a physical thickness of from 7 to 15 nm, one wetting layer having a physical thickness of from 25 to 60 nm, one protective layer having a physical thickness of from 45 to 70 nm.

The Applicant has surprisingly found that the antireflective coating stack according to the invention enables to obtain very good optical performance, especially appropriate for the ophthalmic field.

Indeed, the antireflective coating according to the invention is especially designed to possess very good antireflective performances in the visible regions and/or to minimize the reflection towards the eye of the ultraviolet radiation having an angle of incidence on the lenses especially ranging from 30 to 45°, and its preferred characteristics are described hereunder.

Preferably, the antireflective coating has a mean light reflection factor in the visible region $R_v$ which is lower than or equal to 5%, preferably lower than or equal to 1%, for at least an angle of incidence lower than 35°.

Within the meaning of the invention, the "mean light reflection factor," noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

According to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally, the angle of incidence changes from 0° (normal incidence) to 90° (grazing incidence). The usual range for angle of incidence is from 0° to 75°.

In another embodiment, the multilayered antireflective coating has a mean reflection factor $R_{UV}$ between 280 nm and 380 nm, weighted by the function $W(\lambda)$ defined in the ISO 13666:1998 standard, is lower than or equal to 40%, preferably lower than or equal to 30%, more preferably lower than or equal to 10% and typically lower or equal to 5%, for an angle of incidence in the range 15° to 45°, preferably 30° to 45°.

In the present application, the mean reflection factor $R_{UV}$ between 280 nm and 380 nm, weighted by the $W(\lambda)$ function defined according to the ISO 13666:1998 Standard and noted $R_{UV}$, may be defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein $R(\lambda)$ represents the lens spectral reflection factor at a given wavelength, and $W(\lambda)$ represents a weighting function equal to the product of the solar spectrum irradiance $Es(\lambda)$ and the efficiency relative spectral function $S(\lambda)$.

The spectral function $W(\lambda)$, enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy $Es(\lambda)$ into account, which does globally emit less UVB-rays as compared to UVA-rays, and the spectral efficiency $S(\lambda)$, UVB-rays being more harmful than UVA-rays.

In addition, the ophthalmic lens according to the invention does not absorb in the visible or not much, which means, in the context of the present application, that its transmission factor in the visible range $\tau_V$, also called relative transmission factor in the visible range, is higher than 85%, more preferably higher than 90%, even more preferably higher than 95% when the multilayered antireflective coating of the invention is coated on at least one of the main faces of the substrate, preferably when it is coated on both sides of the substrate faces.

The factor $\tau_V$ should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 5%, preferably is lower or equal to 3% and typically lower than or equal to 1%.

According to one embodiment of the present invention, the antireflective coating deposited onto at least one of the main surfaces of the transparent substrate is such that:

the Chroma C* is equal or lower than 50, preferably equal or lower than 40, more preferably equal or lower than 15, in particular according to the international colorimetric CIE L*a*b* for an angle of incidence θ of 15°, and/or the σh° is lower than or equal to 8, preferably is lower or equal to 5 and typically lower than or equal to 3; and/or the σC* is lower than or equal to 5, preferably is lower or equal to 4.5 and typically lower than or equal to 4.

The colorimetric coefficients of the optical article of the invention in the international colorimetric system CIE L*a*b* are calculated between 280 and 780 nm, taking the standard illuminant D65 and the observer into account (angle of 10°). It is possible to prepare antireflective coatings, without limitation as regards their hue angle. The observer is a "standard observer" as defined in the international colorimetric system CIE L*a*b*.

Especially, σC* corresponds to standard deviation of chroma C* and σh° corresponds to standard deviation of hue h°. These parameters enable in particular to determine the robustness of a lens. Especially, the very low values of σh° and σC* show that the lenses according to the invention have a very good robustness. To determine σh° and σC*, 500 iterations were made so as to evaluate the variations of h° and C* induced by the manufacturing process which may affect the performances and properties of two different lens comprising the same structure (same composition and thickness layers).

Indeed, the antireflective coating of the present invention shows smooth perceived residual color variation according to the angle of incidence θ and has therefore aesthetic appearance.

As the metal layer according to the invention has also conductive property, the optical article of the invention may be antistatic that is to say not to retain and/or develop a substantial static charge. However, to improve antistatic properties, a second charge dissipating conductive layer may be added into the stack present on the surface of the article.

According to one embodiment of the invention, the antireflective coating may comprise a second conductive layer. For instance, said second conductive layer comprises indium oxide, tin dioxide (also known as stannic oxide, $SnO_2$), zinc oxides or mixtures thereof. Preferred second conductive layer consists in tin dioxide.

However, according to another embodiment according to the invention, the antireflective coating preferably does not comprise such a second conductive layer.

Generally, the antireflective coating total thickness, without sub-layer, is lower than 1 micrometer, preferably lower than or equal to 300 nm, more preferably lower than or equal to 200 nm and typically lower than or equal to 150 nm, such as lower than or equal to 120 nm. The antireflective coating total thickness is generally higher than 50 nm, preferably higher than 65 nm. The antireflective coating total thickness is for instance ranging from 50 to 150 nm, especially from 65 to 120 nm, such as 70 to 115 nm.

The various layers of the antireflective coating and the optional sub-layer are preferably deposited by physical vapor deposition, under vacuum, according to any of the following methods: i) by evaporation, optionally ion-beam assisted; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively.

Preferably, the deposition of each of the layers of the antireflective coating and of the optional sub-layer is conducted by evaporation under vacuum.

The present invention provides hence an antireflective coating with an improved conception, comprising a stack made of thin layers, the thicknesses and materials of which have been selected so as to obtain satisfactory antireflective performances both in the visible region and in the ultraviolet region, while having both esthetic appearance and robustness properties.

Preferably, the rear main face and the front main face of the ophthalmic lens are coated with similar multilayered antireflective coatings or with different said multilayered antireflective coatings.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The ophthalmic lens according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating.

Typically, an ophthalmic lens according to the invention comprises a substrate that is successively coated on its rear face with an impact-resistant primer layer, an anti-abrasion and scratch-resistant layer, an antireflective coating according to the invention, and with a hydrophobic and/or oleophobic coating, or with a hydrophilic coating which provides antifog properties, or an antifog precursor coating.

The front face of the substrate of the ophthalmic lens may be successively coated with an impact-resistant primer layer, an abrasion-resistant layer and/or a scratch-resistant layer, an antireflective coating according to the invention, and with a hydrophobic and/or oleophobic coating.

The ophthalmic lens according to the invention is preferably an ophthalmic lens for spectacles (spectacle lens), or a blank for ophthalmic lenses.

The following examples illustrate the present invention in a more detailed, but non-limiting manner.

EXAMPLES

In the examples, four lenses according to the invention (lenses 1 to 4) and three comparative lenses have been prepared (comparative examples 1 to 2).

1. General Procedures

The ophthalmic lens used in the examples comprises a lens substrate ORMA® having a 65 mm diameter, a refractive index in the range of around 1.5, and a power of −2.00 diopters. ORMA® is a registered trademark of ESSILOR. This material is obtained by polymerizing a diethylene glycol bis(allyl carbonate), typically CR39®.

This lens substrate is coated on both sides with a hard coat layer of refractive index about 1.5 (such as those described in EP0614957, noted hereafter "HC1.5"). Especially, the hard coat layer is obtained by deposition and curing of a composition comprising, by weight, 224 parts of GLYMO ([gamma]-glycidoxypropyltrimethoxysilane), 80.5 parts of 0.1 N HCl, 120 parts of dimethyldiethoxysilane, 718 parts of colloidal silica 30% by weight in methanol, 15 parts of aluminum acetylacetonate and 44 parts of ethylcellosolve. The composition also comprises 0.1% by weight/per total weight of the composition of surfactant FLUORAD FC 430 of 3M.

Different antireflective coatings were tested for the examples. These antireflective coatings are disposed onto the above mentioned hard coat layer, on the convex side only (front face).

The layers of the tested antireflective coatings were deposited without heating the substrates by evaporation under vacuum (evaporation source: electron gun).

The deposition frame is a BAK 760 machine fitted with an electron beam source EV-M6 AP&T for evaporating oxides and metal, and provided with ion gun (Comenwealth Mark II) for the preliminary phase to prepare the surface of the substrate using argon ions (IPC) and to evaporate the metal layer (silver) with ions assisted deposition (IAD).

Especially, the deposition step of the $ZrO_2$ and $SiO_2$ are classical and well known by the person skilled in the art.

The method for making ophthalmic lenses comprises a step of introducing the substrate, a step of activating the surface of the substrate by means of an argon ion beam, the steps of turning the ion irradiation off, then forming the various layers of the antireflective coating by successive evaporations (especially, wetting coating/metal layer/protective coating for lenses 1 to 4 according to the invention) and at last a ventilation step.

Deposition of the silver layer was done by evaporation with ion gun at 13 Å/s under IAD with Argon gas.

2. Test Procedure

The thickness of the layers was controlled by means of a quartz microbalance. The spectral measurements were effected on a variable incidence-spectrophotometer Perkin-Elmer Lambda 850 with an URA accessory (Universal Reflectance Accessory).

3. Examples

The structural characteristics of the ophthalmic lenses 1 to 4 according to the invention obtained respectively in the Examples 1 to 4 and the comparative lenses 1 to 2 obtained in the comparative examples 1 to 2 are detailed hereunder at Table 1.

In particular, examples 1 to 3 correspond to direct deposition on a substrate and example 4 corresponds to a deposition on a carrier then a report on the substrate. Wetting layer is always $ZrO_2$ and protection layer is either $ZrO_2$ or $SiO_2$.

In particular, comparative examples 1 and 2 comprise a very thin layer of silver (5 nm and 5.5 nm)

TABLE 1

| Layer (physical thickness in nm) | Ex. 1 | Ex.2 | Ex.3 | Ex.4 | Comp.ex.1 | Comp.ex.2 |
| --- | --- | --- | --- | --- | --- | --- |
| Substrate | ORMA ® | | | | | |
| Hard coat | HC1.5 | | | | | |
| AR coating 1 | $ZrO_2$ (55 nm) | $ZrO_2$ (26 nm) | $ZrO_2$ (30 nm) | $SiO_2$ (66 nm) | $ZrO_2$ (10 nm) | $ZrO_2$ (15 nm) |
| 2 | Ag (10 nm) | Ag (9 nm) | Ag (10 nm) | Ag (9 nm) | Ag (5 nm) | Ag (5.5 nm) |
| 3 | $ZrO_2$ (48 nm) | $SiO_2$ (66 nm) | $ZrO_2$ (30 nm) | $ZrO_2$ (26 nm) Air | $ZrO_2$ (10 nm) | $SiO_2$ (52 nm) |

4. Optical Performances of the Lenses According to the Invention (FIG. 1 to 4)

The reflection mean factor values are those of the front face. The factors $R_v$ and $R_{uv}$ are provided for an angle of incidence θ of 15° and 35° respectively and the colorimetric coefficients of the optical article of the invention in the international colorimetric system CIE L*a*b* are calculated between 380 and 780 nm, taking the standard illuminant D 65 at various angle of incidence θ and the observer into account (angle of 10°) (for all the examples). Values for Chroma at 15° and $R_{uv}$ are averaged values (experimental measures).

In addition, a simulation (theoretical simulations) was made to test the robustness of the antireflective coating according to the invention, especially for lens 1 and lens 2. Hence 500 iterations were made so as to evaluate the variations (+−2.2% in normal distribution) induced by manufacturing process which may affect the performances and properties of two different lenses comprising the same structure (same composition and thickness), such as the residual reflected color (h°, C*, σC* and σh°).

Table 2 below shows the optical performances of lenses 1 to 4 according to the invention, and especially both the experimental and the theoretical performances.

TABLE 2

| Lens | $R_v$, % (380-780) | Ruv, % (280-380 nm) | Tv (%) | C* | σC* | h° | σh° |
| --- | --- | --- | --- | --- | --- | --- | --- |
| Lens 1 (experimental) | 0.56 | 31.4 | 89 | 45 | — | 311 | — |
| Lens 1 (theory) | 0.54 | 32 | 91 | 43 | 3.8 | 305 | 2.8 |
| Lens 2 (experimental) | 0.39 | 9.8 | 89 | 9 | 6 | | |
| Lens 2 (theory) | 0.68 | 4.5 | 91 | 13 | 5.5 | 25 | 1.6 |
| Lens 3 (experimental) | — | — | 83 | — | — | — | — |
| Lens 3 (theory) | — | — | 87 | — | — | — | — |
| Lens 4 (theory) | 0.69 | 3.8 | 89 | 13 | 5.5 | 25 | 1.6 |
| Comparative lens 1 (experimental) | — | — | 73 | — | — | — | — |
| Comparative lens 1 (theory) | — | — | 88 | — | — | — | — |
| Comparative lens 2 (experimental) | 0.53 | — | 75 | — | — | — | — |
| Comparative lens 2 (theory) | 0.54 | 2 | 95 | 9 | 0.3 | 289 | 5.4 |

It could be first observed from Table 2 and FIG. 1 to 4 that experimental results are similar to the theoretical results. Thus, it will be easier to control the colorometric parameters of the lenses according to the invention and therefore, to control their robustness. As it will be shown below, these similar results are due to the absence of metal clusters. Indeed, the wetting layer provides for obtention of a continuous layer of silver layer which avoids surface plasmon.

In addition, lenses 1 to 4 according to the invention have good optical performances. For instance, the antireflective coating of lens 1 is adapted to cover a convex surface of a lens substrate with its high reflection rate in the UV bands and its low Rv. Its residual reflected color is blue-purple. Lens 2 has, due to the presence of the protective layer made of $SiO_2$ of a relatively large thickness (66 nm), an excellent resistance to crazing. Moreover, the lenses 1 and 2 according to the invention have an excellent transmission (Tv>89%).

Lens 4 obtained by a report method shows the same structure as lens 2, but in opposite order moving away from substrate. Performances of lenses 4 and 2 are very similar.

5. Influence of the Metal Layer Thickness (FIGS. 5 and 6)

Lens 3 according to the invention comprising a silver layer having a thickness of 10 nm has been compared with the comparative lens 1 comprising a silver layer having only a thickness of 5 nm. Lens 3 is not as good as lenses 1, 2 or 4 as can be seen from Tv value. But lens 3 demonstrates that a continuous layer of silver has been deposited while the layer of silver on comparative lens 1 is not continuous.

Figure 5:
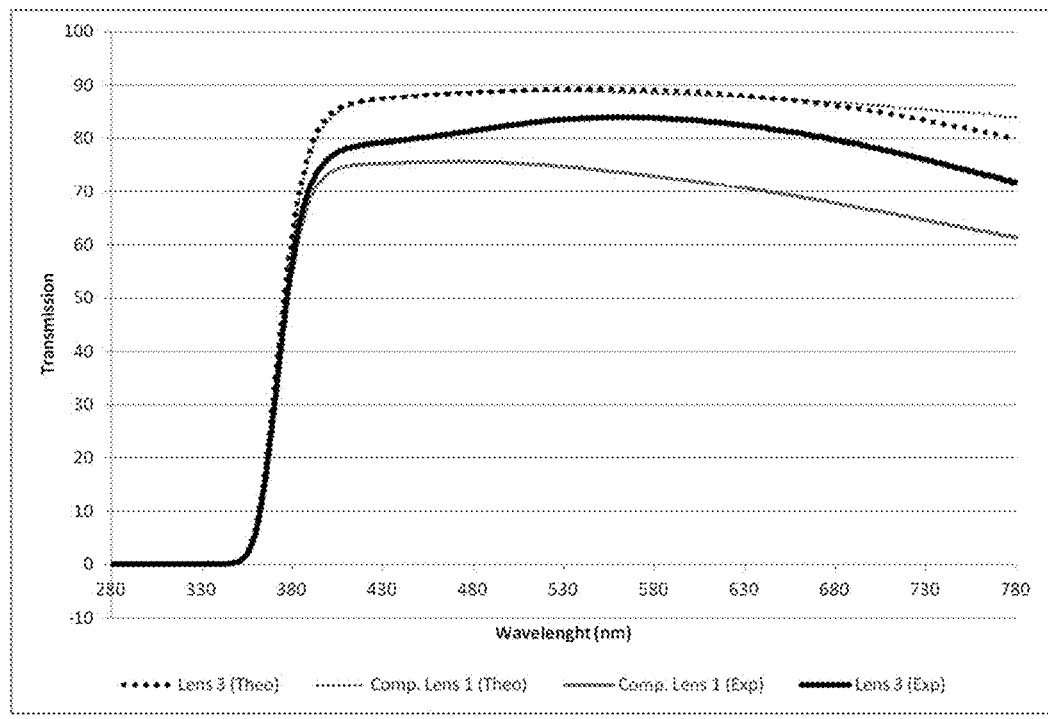
FIG. 5 shows the variation of the experimental and theoretical Transmission Tv of the lens 3 according to the invention and of the comparative lens 1 as function of the wavelength (280 to 780 nm) at an angle of incidence of 0°.

It could be observed from FIG. 5 that the comparative lens 1 is subjected to plasmonic effects. There is indeed a clear difference between the theoretical transmission (88%) and the transmission obtained from experimental assay (73%). For lens 3 according to the invention, this difference between the theoretical transmission (88%) and the transmission obtained from experimental assay (83%) is very low. This means that the silver layer of 10 nm of thickness is continuous and there is no surface plasmon.

Figure 6:
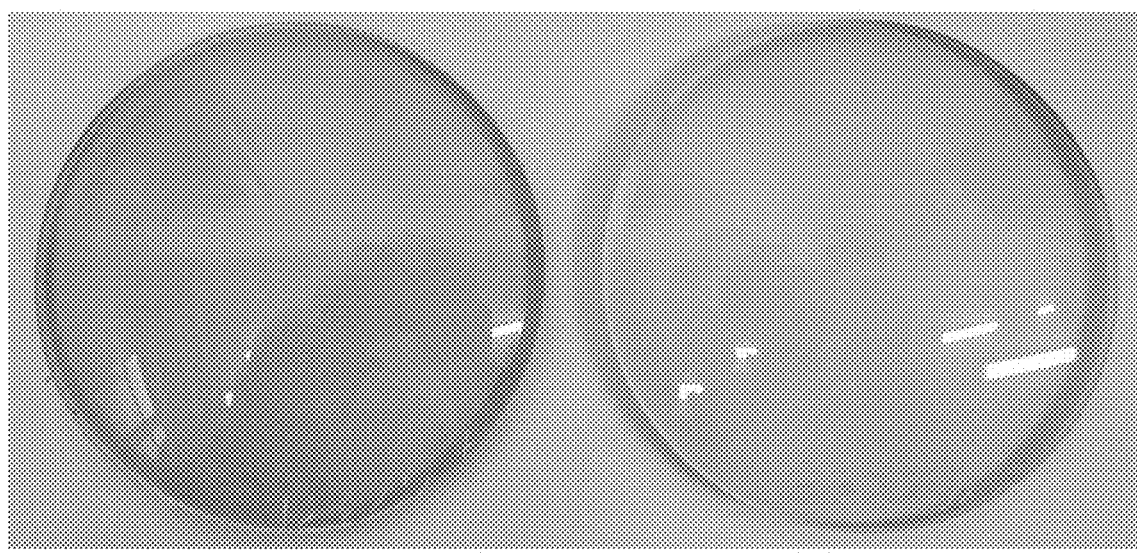
FIG. 6 shows two pictures of lens 3 according to the invention (b) and of the comparative lens 1 (a)

To the subject, FIG. 6 shows that the comparative lens 1 has a residual reflected color which is blue ($L^*=88.82$, $a^*=-1.66$, $b^*=-1.4$) and which is therefore not appropriate for the ophthalmic field, whereas the lens 3 according to the invention has a neutral or white residual reflected color ($L^*=93.4$, $a^*=-0.98$, $b^*=2.27$) (international colorimetric CIE $L^*a^*b^*$).

Comparative lens 2 demonstrates the same trend as comparative lens 1. While theoretical transmittance is computed at 95%, experimental transmittance is only 75%. This large difference is due to surface plasmon effect and evidence that silver layer is not continuous.

In addition, so as to show the influence of the silver layer thickness, the Applicant has developed an assay consisting in measuring the resistivity (ohm) of different films comprising a silver layer according to the thickness of said silver layer. The aim of this assay is to measure the silver percolation threshold.

For this assay, several silver layers having different thicknesses from 4 nm to 20 nm have been deposited directly on a varnish having a thickness of 2 μm, on a $ZrO_2$ layer having a thickness of 20 nm or on a $SnO_2$ layer having a thickness of 10 nm. Two electrodes were disposed on the silver layer immediately after silver deposition, so as to avoid oxidation, with a distance of 58 mm between electrodes. Resistance was measured with a standard electrical multimeter.

Figure 7:
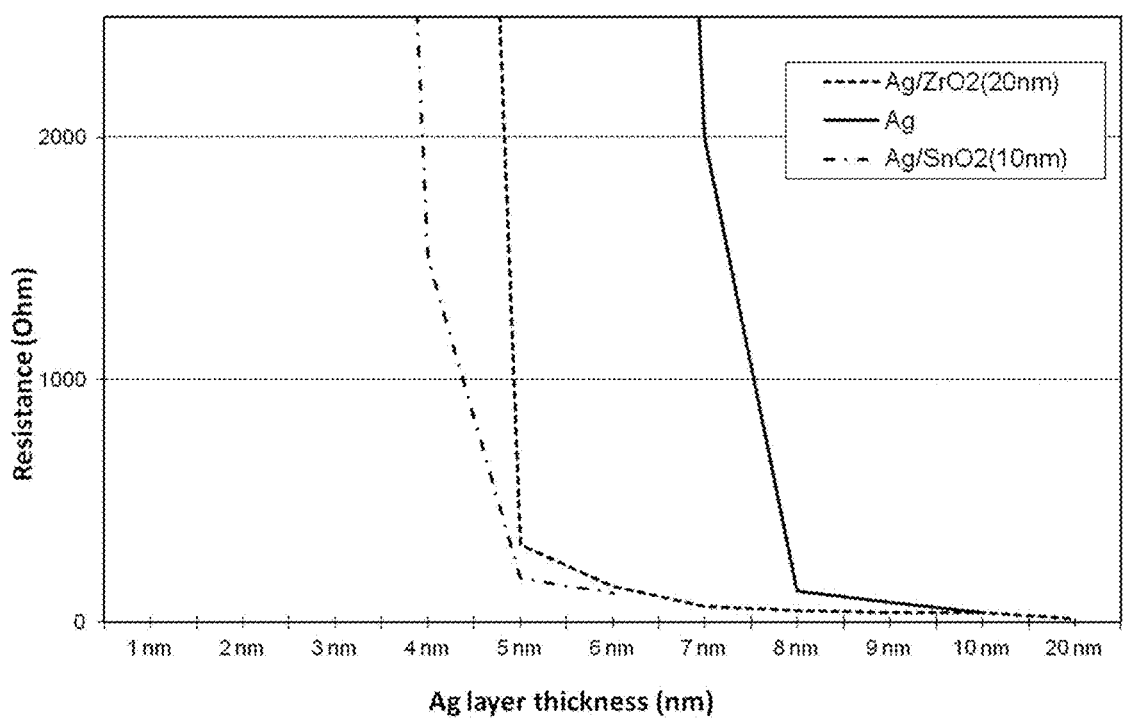
FIG. 7 shows the resistivity (ohm) of three different films comprising a silver layer disposed on varnish (solid line), on $ZrO_2$ coating (dotted line) or on $SnO_2$ (semi dotted line) coating as function of the thickness of Ag layer.

The result of this assay is illustrated on FIG. 7. It could be observed that with a thickness of 6 nm, the silver percolation threshold is reached both for $SnO_2$ and for $ZrO_2$. This means, that it is necessary to have a silver layer of at least 6 nm for obtaining a continuous silver layer and avoiding surface plasmon, even in presence of a wetting layer.

From this assay, it is also clear that a continuous silver layer cannot be obtained directly on a varnish (without wetting layer) for thicknesses below 8 nm.

The invention claimed is:

1. An ophthalmic lens comprising a transparent substrate with a front main face and with a rear main face, at least one of the main faces being coated with a multilayered antireflective coating comprising a stack composed of at least:
   (i) a wetting layer;
   (ii) a metal layer, wherein the metal is selected from silver, gold or copper or mixtures thereof; and
   (iii) a protective layer which is able to avoid oxidation of said metal layer;
   characterized in that the wetting layer (i) is in direct contact with the metal layer (ii), with the proviso that said multilayered antireflective coating does not comprise silicon nitride, wherein the metal layer (ii) has a physical thickness ranging from 6 nm to 20 nm, and wherein the multilayered antireflective coating has a total thickness ranging from 50 nm to 150 nm.

2. The ophthalmic lens according to claim 1, wherein (ii) the metal layer has a physical thickness ranging from 7 nm to 15 nm.

3. The ophthalmic lens according to claim 1, wherein (ii) the metal layer consists of silver.

4. The ophthalmic lens according to claim 1, wherein (i) the wetting layer has a physical thickness higher than or equal to 10 nm, and lower than or equal to 70 nm.

5. The ophthalmic lens according to claim 4, wherein (i) the wetting layer has a physical thickness higher than or equal to 20 nm and lower than or equal to 70 nm.

6. The ophthalmic lens according to claim 1, wherein the luminous Transmittance (Tv) in the visible spectrum through said ophthalmic lens is higher than 85%.

7. The ophthalmic lens according to claim 1, wherein (iii) the protective layer has a physical thickness higher than or equal to 10 nm and lower than or equal to 80 nm.

8. The ophthalmic lens according to claim 7, wherein (iii) the protective layer has a physical thickness higher than or equal to 20 nm and lower than or equal to 80 nm.

9. The ophthalmic lens according to claim 1, wherein (i) the wetting layer has a surface energy which is equal to or lower than 45 mN/m.

10. The ophthalmic lens according to claim 9, wherein (i) the wetting layer has a surface energy which is equal to or lower than 40 mN/m.

11. The ophthalmic lens according to claim 1, wherein (i) the wetting layer has a high refractive index which is higher than 1.55.

12. The ophthalmic lens according to claim 1, wherein (i) the wetting layer is made from a component selected from: $ZrO_2$, $SnO_2$, $ZnO$, $TiO_2$, $Nb_2O_5$, $Y_2O_3$, $HfO_2$, $Sc_2O_3$, $Ta_2O_5$, $Pr_2O_3$, $Al_2O_3$ or mixtures thereof.

13. The ophthalmic lens according to claim 12, wherein (i) the wetting layer is made from a component selected from: $ZrO_2$, $TiO_2$ or $Ta_2O_5$.

14. The ophthalmic lens according to claim 1 wherein (iii) the protective layer is made from a component selected from: $SiO_2$, $ZrO_2$, $SnO_2$, $ZnO$ or mixture thereof.

15. The ophthalmic lens according to claim 1, wherein (iii) the protective layer is made from a component selected from: $ZrO_2$ or $SiO_2$.

16. The ophthalmic lens according to claim 1, wherein the three layers (i) to (iii) are in direct contact in the following order in the direction moving away from substrate:
   wetting layer then metal layer then protection layer, or
   metal layer then wetting layer then protection layer.

17. The ophthalmic lens according to claim 1, wherein said multilayered antireflective coating only comprises said three layers (i) to (iii).

18. The ophthalmic lens according to claim 1, wherein the mean light reflection factor in the visible region Rv of said multilayered antireflective coating is lower than or equal to 5% for at least an angle of incidence lower than 35°.

19. The ophthalmic lens according to claim 1, wherein the mean light reflection factor in the visible region Rv of said multilayered antireflective coating is lower than or equal to 1%, for at least an angle of incidence lower than 35°.

* * * * *